INVENTORS.
WILLIAM P. OEHLER
CHARLES H. YOUNGBERG
BY
ATTORNEYS

INVENTORS.
WILLIAM P. OEHLER
CHARLES H. YOUNGBERG

Dec. 26, 1961  W. P. OEHLER ET AL  3,014,541
SEMI-FLEXIBLE WHEEL HARROW
Filed March 21, 1958  4 Sheets-Sheet 4
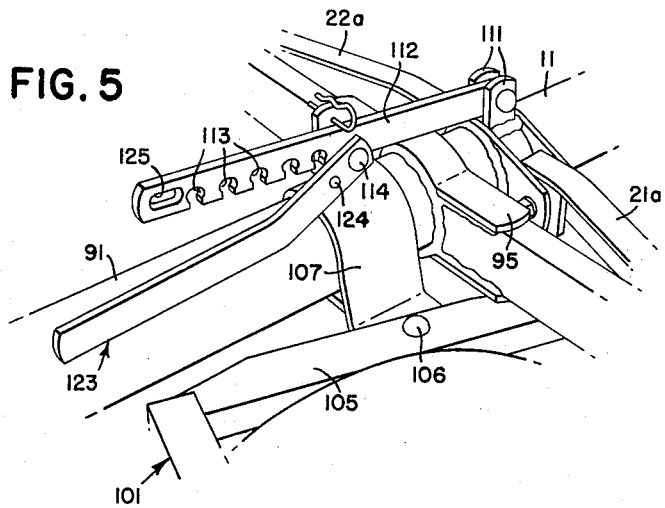
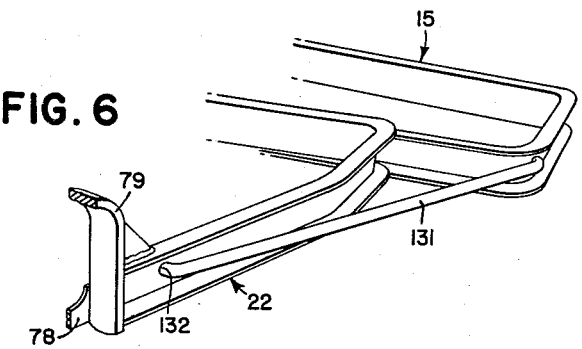
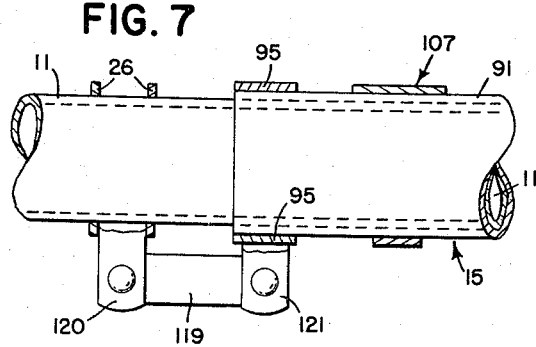
INVENTORS.
WILLIAM P. OEHLER
CHARLES H. YOUNGBERG
BY
ATTORNEYS United States Patent Office 3,014,541
Patented Dec. 26, 1961

3,014,541
SEMI-FLEXIBLE WHEEL HARROW
William P. Oehler and Charles H. Youngberg, Moline, Ill., assignors, by mesne assignments, to Deere & Company, a corporation of Delaware
Filed Mar. 21, 1958, Ser. No. 722,922
23 Claims. (Cl. 172—591)

The present invention relates generally to agricultural implements, and more particularly to ground working implements such as disk harrows and the like.

The object and general nature of the present invention is the provision of a new and improved disk harrow of the wheel-carried tandem type which incorporates the simplicity and performance of a rigid harrow with provision for some flexibility and for adjusting the cutting angle of the disk gangs. Specifically, one feature of this invention is the provision of a disk harrow having a generally fore-and-aft extending frame member, to the rear portion of which a transverse rigid member is swingably connected, this member carrying rear gangs that are adjustable in a generally horizontal plane relative to the swingable member, the forward portion of the fore-and-aft extending frame member pivotally receiving right and left hand front frames to which horizontally adjustable front gangs are connected.

An additional feature of this invention is the provision of a disk harrow having front gangs, the laterally inner ends of which carry mutually reacting bumpers, with means providing for angling adjustment of the gangs and for movement about a generally fore and aft extending axis, and in addition, means for holding the gangs in such position laterally of the harrow so as to insure that the bumpers will always lie substantially in a vertically fore-and-aft extending generally central plane. A further feature of this invention is a provision of a disk harrow of the wheel type, by which the wheeled carrier serves as means for limiting the vertical swinging of the front gangs.

These and other objects and advantages of the present invention will be apparent to those skilled in the art after a consideration of the following detailed description, taken in conjunction with the accompanying drawings, in which:

FIG. 5 is a fragmentary perspective view of the rear gang angle control means.

FIG. 6 is a fragmentary perspective view of one of the links connecting the outer portions of the front and rear frames.

FIG. 7 is a fragmentary side view of the link connecting the central portions of the front and rear frames.

Figure 1:
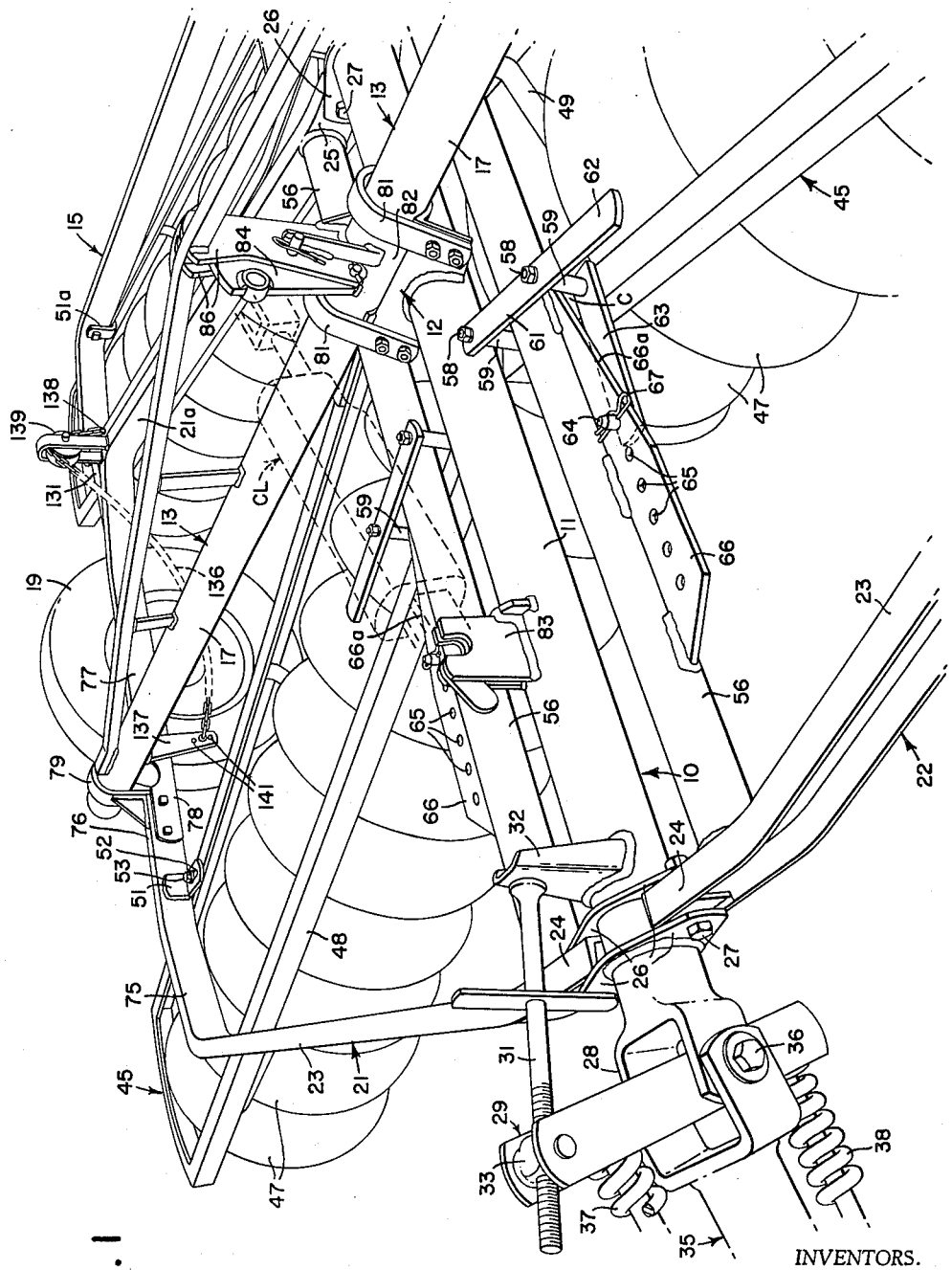
FIG. 1 is a fragmentary perspective view of the forward portion of a tandem disk harrow in which the principles of the present invention have been incorporated.

The frame structure of this harrow includes a main frame indicated in its entirely by the reference numeral 10 and consisting principally of a fore-and-aft extending tubular member in the form of a rigid pipe 11 having adjacent its forward portion a transverse section 12, that, as explained in more detail later, serves as a means for rockably receiving a transversely disposed wheel carrying means 13. The frame structure of this harrow also includes a rear rigid transversely disposed frame member 15 rockably mounted on the rear end of the pipe member 11 for movement relative thereto about a fore-and-aft extending axis coinciding generally with the longitudinal axis of the frame member 11. The wheel carrier means 13 includes a transverse rigid pipe member 17 rockably mounted at its intermediate portion on the transverse frame section 12 and having as its ends downwardly and rearwardly extending arms 18 on which ground wheels 19 are journaled. The wheel carrier means 13 is disposed ahead of the rear rockable frame section 15.

The frame means of this harrow also includes right and left hand forward frame sections 21 and 22, each made up of a generally U-shaped channel 23 having its laterally inner ends 24 and 25 pivotally connected with the forward portions of the main frame member 11. To this end, the latter member carries pairs of laterally extending lugs 26 that are apertured to receive pivots 27 by which the ends 24 and 25 of the front frame members are swingably connected with the main frame pipe member 11 for generally vertical movement relative thereto. Each of the pairs of lugs 26 are rigidly connected, as by welding, to the associated portion of the main pipe member 11.

A yoke 28 is fixed to the forward end of the member 11 and swingably receives a generally vertical hitch part 29, the position of which relative to the pair of frames is regulated by crank screw means 31. The latter means is rotatably anchored to a bracket 32 that is fixed to the forward end of the pipe 11, and the screw means 31 is threaded into a trunnion or swivel 33 carried by the upper end of the rockable hitch member 29.

A tongue 35 is pivotally connected, as by the same member 36 that connects the member 29 to the yoke 28, and upper and lower cushioning springs 37 and 38 are connected between the upper and lower ends of the swingable hitch member 29 and brackets (not shown) fixed to the upper and lower portions of the draft tongue 35. The latter member carries the usual hitch clevis by which the harrow may be connected to a propelling tractor. By turning the crank screw 31, the draft tongue 35 is adjusted for various heights of tractor draw bars, and this means also serves to keep the harrow level, both in transport and in operation.

A pair of front gangs 45 are connected to the right and left hand frame members 21 and 22. Each gang 45 includes a bumper 46, a plurality of disks 47, and an associated gang frame 48, all of generally conventional construction. The gang frame 45 comprises a generally U-shaped channel member having rounded outer ends and inner ends rigidly interconnected by conventional bearing standard means 49.

The disk gangs 45 are swingably connected at their outer end portions with the laterally outer portions of the associated frame sections 21 and 22. Each of such swingable connections is provided by means of an angle 51 fixed, as by welding or the like, to the outer portion of the associated front frame section, the horizontal portion of the angle bracket 51 being slotted, as at 52, and a pin or stud 53 carried rigidly by the rear angle section of the associated gang frame 48. Thus, each gang is not only permitted to swing in a generally horizontal plane relative to the associated vertically swingably front frame sections, but also each gang is capable of lateral displacement which will be referred to in detail below.

Each of the right and left hand front frame sections 21 and 22 has its laterally inner ends interconnected by means of a fore-and-aft extending pipe or bar 56, the ends of which are secured by welding to the inner ends of the associated front frame ends 24 and 25. The inner ends of the associated gang frames 48 are disposed underneath the associated fore-and-aft extending pipe member 56 in generally sliding relation, whereby, when in working position, the inner portions of the vertically swingable front frame sections are supported on the laterally inner ends of the associated gangs and the outer ends of the front frame sections are supported on the laterally outer portions of the gang frames. Also, the gangs may be angularly adjusted by shifting the inner ends thereof generally fore-and-aft along the associated frame bars 56. To this end, the laterally inner end portion of each front gang frame section is apertured to receive a pair of vertical bolts 58 that extend upwardly from the gang frame, receive spacers 59, and pass through apertures in an upper bar 61 that overlies the associated gang frame member 56. One end of the bar 61 is extended, as at 62, to form a handle by which the position of the gangs may be adjusted manually, as desired. The laterally outer spacers 59 loosely receive the rear end of a forwardly extending angle controlling bar 63 in the forward end of which a pin 64 is disposed so as to extend upwardly through a selected aperture 65 in a generally fore-and-aft extending bar 66 that is welded to the outer side of the adjacent frame bar 56. The upper end of the pin 64 is apertured to receive a quick detachable hair pin connector 67. The working angle of each of the front gangs 45 may readily be changed, as desired, merely by removing the associated detachable connectors 67, disconnecting the front end of the bar 63 from the associated bar 66, and then grasping the handle 64 and shifting the laterally inner end of the associated gang in the desired direction. After the position has been selected, the pin 64 is reinserted in the selected opening 65 and the connector 67 reattached, thus securing the gang in desired position of adjustment.

According to the principles of the present invention, the gang angle adjusting mechanism just described includes means by which the inner or bumper ends of the gang 45 are maintained in all positions of adjustment substantially in a vertical fore-and-aft extending central plane of the harrow. As mentioned above, each of the front gangs 45 is provided with a bumper 46, such bumpers normally being in mutually contacting relation when the harrow is in operation, whereby the laterally inwardly directed thrust, developed in each gang by virtue of the soil pressure against the disks, is opposed by the substantially equal thrust developed in the other gang. For best operation, the innermost disks of the front gangs should be quite close together and maintained at all times substantially in the central vertical fore-and-aft extending plane of the harrow. According to this invention, the laterally outer edge sections 66a cooperate with the laterally outer spacers 59, which thereby serve as edge-engaging abutments, and the edge sections 66a are so shaped that in the different positions of angular adjustment of the gangs, the lateral inner ends of the gangs are positioned so that the bumpers 46 contact one another substantially in a vertical fore-and-aft extending plane passing through the center of the harrow. There is, however, slight clearance C (FIG. 1) normally between the edges 66a and the spacers 59 so that the laterally inwardly directed thrusts of the front gangs are taken primarily by the bumpers 46 and not by the spacers 59 and edges 66a. However, the spacers 59 and edges 66a nevertheless will function to keep the inner ends of the gangs centered, if, for example, soil conditions should be such that the gangs tend to be shifted in one direction or the other away from the center of the harrow, which lateral shifting within limits is permitted by the slots 52. Also, the edges 66a serve as cam means and, in cooperation with the spacers 59, are available to maintain the laterally inner ends of the front gangs in proper position if it should occur, for example, that the inner end of one of the front gangs should be forced upwardly relative to the other gang and one bumper 46 tend to ride up onto the other bumper. Thus, in effect, the laterally outer spacers 59 and associated bar edges 66a serve as centering means, maintaining the inner ends of the front gang 45 substantially in the middle of the harrow during all normal working positions. The slots 52 and the associated brackets 51 accommodate lateral shifting of the gangs incident to the movement thereof to their various positions of angling adjustment while the bumpers are maintained in contact with one another as just described. Also, it will be noted that in this harrow, the front gangs may swing generally vertically with the front frame section 21 and 22 whenever the implement passes over uneven ground while at the same time substantially uniform depth of operation is maintained.

Figure 4:
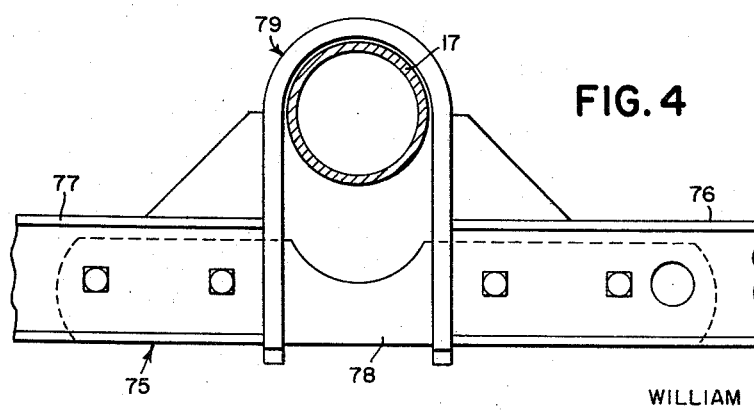
FIG. 4 is an enlarged sectional view showing the connection between the outer portions of the front frames and the wheel frame.

The permissive downward swinging of the front frame sections 21 and 22 is, however, limited so that whenever the harrow is raised into a transport position, the front gangs are raised out of engagement with the ground. For this purpose we make use of the laterally extending wheel carrier means 13 as a means for limiting the downward movement of the front frame sections 21 and 22 relative to the main frame section 10. Referring to FIGS. 1 and 4, it will be seen that each of the front frame sections 21 and 22 includes a laterally outer bar 75 that extends in a generally fore-and-aft direction, and, in effect, is made up of two sections 76 and 77 suitably interconnected by a bar 78 that passes underneath the associated outer end of the wheel carrier pipe member 17. The frame sections 75 and 76 are further interconnected by a U-shaped yoke 79 that embraces the outer end of the wheel carrier pipe member 17 passing over the latter and disposed closely adjacent the wheel-carrying arms 18. The yokes 79 rest on the end portions of the pipe member 17 whenever the wheel carrier is actuated to force the wheels 19 downwardly so as to elevate the frame and thus raise the gangs 45 off the ground into a transport position. The wheel carrier member 17 is rockable relative to the transverse section 12 and is held in place thereon by U-shaped strap members 81 that are bolted to cross plates 82 that form the principal part of the transverse structure 12.

For rocking the wheel carrier between transport and operating positions, a conventional remote cylinder CL (dotted line, FIG. 1) is connected between a front bracket 83 and a generally vertical arm 84 swingably carried by the pipe member 17 between two spaced apart arms 86 that are fixed, as by welding, to the rockable pipe member 17. It will be observed that the latter member serves as a rigid part that extends transversely of and generally rigid with respect to the frame member 11 for the purpose of limiting the downward swinging of the front frame sections 21 and 22 relative to the main frame.

Figure 2:
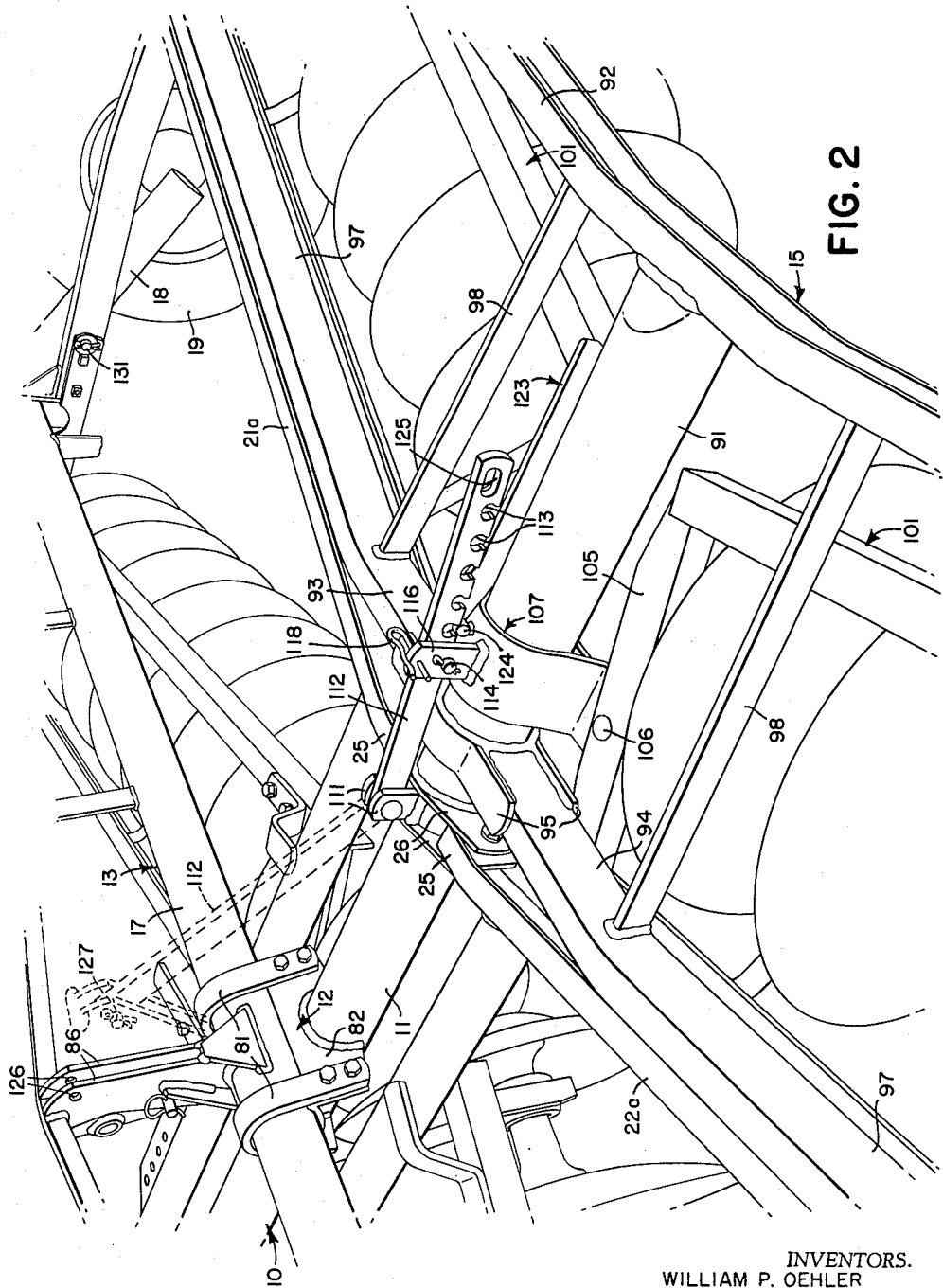
FIG. 2 is a fragmentary perspective view of the rear portion of the disk harrow shown in FIG. 1.
Figure 3:
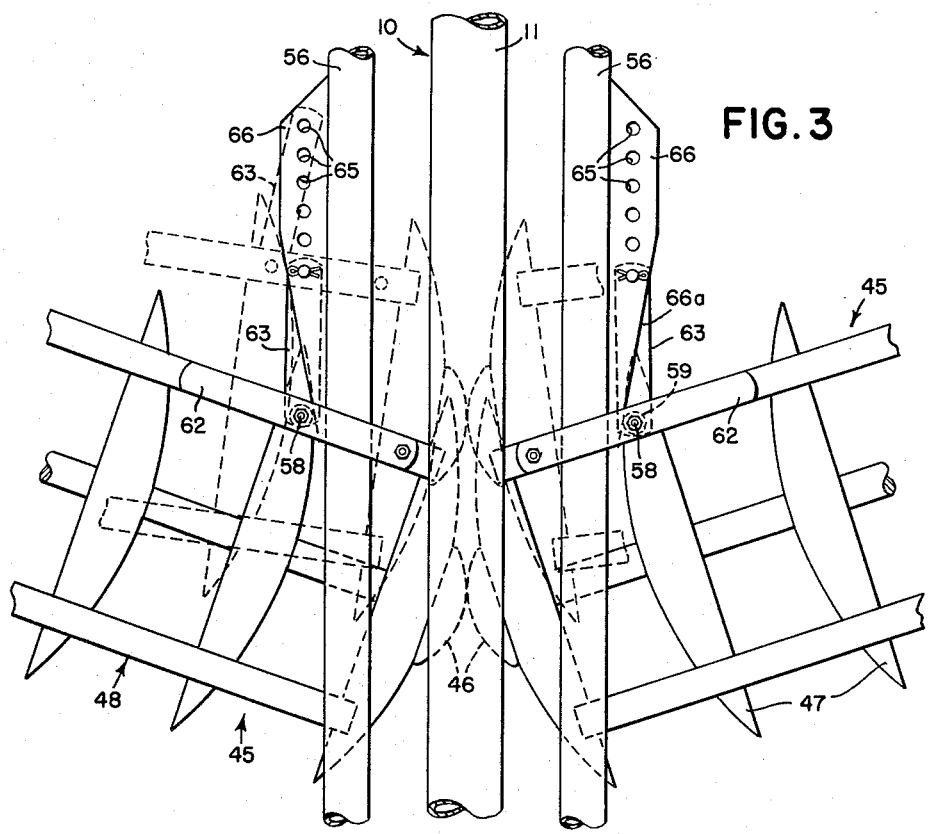
FIG. 3 is a fragmentary plan view of the angling means for the inner ends of the front gangs.

The transverse rigid rear frame member 15 mentioned above is rockably disposed on the rear end of the pipe member 11 immediately rearward of the two vertically swingable front frame sections 21 and 22. The rear frame member 15 comprises a central pipe section 91 to which a generally rectangular member 92 is welded. As best shown in FIG. 2, the rear frame 15 is made up of a single length of channel, indicated at 92, that is bent into the form of two right and left U-shaped sections, with ends 93 and 94 welded to upper and lower straps 95 that, in turn, are welded to the front end of the sleeve 91. The front bar portions 97 of the frame 15 are shaped to lie closely adjacent the rear portions 21a and 22a of the front frame sections 21 and 22. Fore-and-aft extending braces 98 reinforce the channel member 92.

Each of the rear gangs is indicated by the reference numeral 101 and, like the front gangs 45, the inner ends of the rear gangs 101 are connected with the frame 15 for fore-and-aft movement in a generally horizontal plane, but nevertheless, the rear gangs are oscillatable in a generally vertical direction with the frame 15 about the rear end of the pipe member 11. Each gang 101 is pivotally connected at its outer end with the associated end of the transverse rigid frame member 15 by pivot means that includes slotted bracket and pin means 51a that is substantially of the same construction as the parts 51–53 described above in connection with the front gangs. The laterally inner end of each rear gang frame includes a fore-and-aft extending laterally inner bar 105 that is pivotally connected, as at 106, to a fore-and-aft shiftable yoke 107 carried by the forward portion of the sleeve 101. Thus, shifting the yoke 107 along the sleeve 91 serves to change the angle of the rear gangs. According to this invention, simple manually operated means is provided for shifting the yoke 107 and such means will now be described.

Carried on the rear end of the pipe member 11 is an upper pair of vertically extending apertured lugs 111 in which the forward end of a link 112 is swingably received. The rear portion of the link 112 is provided with a plurality of rounded notches 113, any one of which is adapted to be engaged with a pin 114 normally retained in an aperture formed in a vertically extending lug 116 welded to the upper central portion of the yoke 107. The lug 116 is also apertured at its upper part to detachably receive a hair pin connector 118 that, when in place, serves to hold the link 112 engaged with the pin 114 on the lug 116. Since the link 112 is connected at its forward end with the rear portion of the main frame pipe 11, and, as just described, with abutment means in the form of the generally central portion of the rear swingable frame 15 through the yoke 107, the rear gangs are by this means held in the desired angular position.

By removing the hair pin retainer 118, the link 112 may be lifted away from the pin 114, thus releasing the yoke 107 and the inner ends of the rear gangs from their connection with the main frame, whereby the inner ends of the rear gangs may now be shifted to reduce or increase the working angle, as desired. In order to facilitate making this change of angle of the rear gangs, we provide a simple lever 123. This part carries the above mentioned pivot pin 114 and also a second pin or stud 124 that is so spaced relative to the pin 114 that when the lever 123 is in a horizontal position the pin 124 is spaced so as to immediately enter one of the notches 113 of the angle-retaining link 112. The parts are so proportioned that the lever 123 can be raised to bring the stud 124 into the adjacent notch 113. Further upward swinging of the lever 123 at first disengages the adjacent notch 113 from the pin 114, and then further swinging of the lever 123 acts through the angle retaining link 112 to shift the yoke 107 rearwardly along the sleeve 101, thus changing the working angle of the rear disk gangs. Almost any desired mechanical advantage may be provided by this arrangement, since the lever 123 may be made quite long as shown. If the yoke 107 is in its rearward position, the same may be shifted forwardly generally by an operation of the lever 123 in the reverse direction, that is, by first raising the link 112, swinging the lever 123 forwardly, and then reengaging the pin 124 in one of the notches 113 and swinging the lever 123 rearwardly. After the yoke has been thus shifted to the selected position, the link 112 may be held in engagement with the pin 114 by the hair pin retainer 118.

The link 112 has another function in which it cooperates with the arms 86 to hold the wheel carrying means 13 in a transport position, permitting the convenient removal of the power cylinder CL from the harrow whenever the latter is to be placed out of operation and the tractor used elsewhere. For this purpose, the rearmost end of the link 112 is provided with an opening 125. The opening is in the nature of a slot and cooperates with openings 126 in the wheel carrier arms 86 so that, when the harrow has been raised into its transport position by the full extension of the power unit CL associated with the harrow the lever 112 can be swung forwardly to its dotted line position, FIG. 2, and then a pin 127 can be disposed through the openings 125 and 126 after which the cylinder may be retracted and then removed from the harrow. Thus, the lever 112 serves to hold the wheel carrier 13 in its lowered or transport position. Also, the lever 112, which serves now as a lock-up link, can be used to hold the wheel carrier in transport position when moving the harrow from place to place, thus relieving the power cylinder CL of that function.

As best shown in FIG. 6, operating stresses are transmitted between the laterally outer end portions of the rear frame 15 and the front frame sections 21 and 22 by means of fore-and-aft extending links 131 that are pivotally connected at their forward ends with apertured portions 132 of the front frame sections 21 and 22 immediately in the rear of the wheel carrier receiving yokes 79. The rear ends of the links 131 are pivotally connected to the outer end portions of the rear frame 15. Thus, considering the rear frame 15 and the associated rear gangs 101 as a unit, the link 112 connects the generally central portion of such unit to the rear end portion of the pipe 11 while the outer ends of such unit are connected through the outer links 131 with the front frame sections.

Centrally, the angle adjusting link 112 serves to transmit stresses from the rear portion of the main pipe 11 directly to the laterally inner ends of the rear gangs through the yoke 107 and associated parts. It will be observed that by this way the generally fore and aft soil reaction against the laterally inner ends of the rear gangs is transmitted directly to the rear end of the pipe 11, the front end of which receives the draft tongue or hitch member 35 whereby substantially a straight line transmission of the draft force is secured. This is, of course, superior to the transmission of such stresses in a round about fashion, such as by transmitting stresses from the inner ends of the rear gangs to outwardly disposed portions of the front frame means and then toward the center to hitch-receiving parts.

Further as shown in FIG. 7 the central portion of the rear frame 15 is connected directly to the main pipe 11 by a link 119 loosely pivoted at its ends to forward lugs 120 fixed to the rear portion of the pipe 11, at the underside thereof, and to rear lugs 121 fixed to the forward portion of the sleeve 91. Thus, generally speaking, the links or parts 112 and/or 119 serve to connect the central portion of the rear units, consisting of the rear frame 15, the rear gangs 101, and associated parts, with the rear portion of the main pipe 11, while the outer links 131 connect the outer end portions of the rear unit with the front frames 21 and 22.

When the gangs are lowered into operating position, the rear frame unit 15 is capable of oscillation about the rear end of the main pipe 11, the link 112 and associated parts having sufficient looseness to accommodate this action. However, as best shown in FIG. 1, when the wheels are lowered to raise the gang into a transport position, chains 136 that are connected at the forward ends to arms 137 on the pipe 17 and at their rear ends to lugs 138 fixed to the forward portion of the frame 15 act against sheaves 139, through which the chains pass, to center the rear frame 15 and hold the latter against oscillation during transport. The forward ends of the chains 136 are connected into one of several available openings 141 formed in the associated arms 137. This makes it possible to impart any desirable degree of tautness to the chains 136 when the harrow is raised.

While we have shown and described above the preferred structure in which the principles of the present invention have been incorporated, it is to be understood that our invention is not to be limited to the particular details, shown and described above, but that, in fact, widely different means may be employed in the practice of the broader aspects of our invention.

What we claim, therefore, and desired to secure by Letters Patent is:

1. A disk harrow comprising a main frame including a fore-and-aft extending member and a first transverse member connected at an intermediate point with the foreand-aft extending member, a rear transverse rigid member swingably connected with the rear portion of said fore-and-aft extending member for movement about the axis of said fore-and-aft extending member, whereby the end portions of said transverse rigid member move generally vertically, a pair of rear gangs, means fixing said rear gangs to said rear transverse member to swing therewith about the rear portion of said first mentioned member, a pair of front gangs swingably connected with the forward portion of said first mentioned member for generally vertical swinging relative thereto, and means acting between said first transverse member and said rear transverse rigid member for limiting said vertical swinging thereof.

2. A disk harrow comprising frame means including a fore-and-aft extending member and a transverse section rigid with said fore-and-aft extending member and disposed adjacent the forward portion of the fore-and-aft extending member, wheel carrier means disposed generally transversely of said fore-and-aft extending member and rockably connected in frame-supporting relation with said rigid transverse section, a rear transverse frame member movably connected with the rear portion of said fore-and-aft extending member rearwardly of said wheel carrier means and swingable about said rear portion, a pair of rear gangs disposed at opposite sides of said rear portion and connected with said rear transverse frame member, right and left hand frame members each pivotally connected at its laterally inner portion with the generally forward portion of said fore-and aft extending member at points located at opposite sides of said rigid transverse section and each right and left hand frame member being swingable generally vertically relative to said fore-and-aft extending member forward of said rear transverse frame member, each of said right and left hand frame members including generally fore and aft extending laterally outer bar means that passes underneath the associated end portion of said wheel carrier means, means passing over said wheel carrier means and connected with said fore and aft extending bar means to limit the vertical swinging of said right and left hand frame members relative to said disk harrow frame means, and a pair of front gangs connected, respectively, with said right and left hand frame members.

3. A disk harrow comprising frame means including a fore-and-aft extending member and a transverse section rigid with said fore-and-aft extending member and disposed adjacent the forward portion of the fore-and-aft extending member, wheel carrier means disposed generally transversely of said fore-and-aft extending member and rockably connected in frame-supporting relation with said rigid transverse section, a rear transverse frame member movably connected with the rear portion of said fore-and-aft extending member rearwardly of said wheel carrier means and swingable about said rear portion, a pair of rear gangs disposed at opposite sides of said rear portion and connected with said rear transverse frame member, right and left hand frame members each pivotally connected at its laterally inner portion with the generally forward portion of said fore-and-aft extending member and each swingable generally vertically relative thereto forward of said rear transverse frame member, means connected with said frame means to limit the generally vertical swinging of said right and left hand frame members, said limiting means acting between the laterally outer portions of said wheel carrier means and said front frame members for limiting the vertical swinging thereof, and a pair of front gangs connected, respectively, with said right and left hand frame members.

4. A disk harrow comprising frame means including a fore-and-aft extending member and a transverse section rigid with said fore-and-aft extending member and disposed adjacent the forward portion of the fore-and-aft extending member, wheel carrier means disposed generally transversely of said fore-and-aft extending member and rockably connected in frame-supporting relation with said rigid transverse section, a rear transverse frame member movably connected with the rear portion of said fore-and-aft extending member rearwardly of said wheel carrier means and swingable about said rear portion, a pair of rear gangs disposed at opposite sides of said rear portion and connected with said rear transverse frame member, a pair of front right and left hand frame members pivotally connected with the generally forward portion of said fore-and-aft extending member and swingable generally vertically relative thereto, said rockable wheel carrier means extending laterally outwardly beyond said front frame members, means supporting the laterally outer portions of said front frame members for limited vertical movement on the laterally outer portions of said wheel carrier means, and a pair of front gangs shiftably connected, respectively, with said right and left hand frame members.

5. In a disk harrow, frame means including a fore-and-aft extending member, a pair of front frames, each comprising a generally U-shaped part pivoted at its ends to said fore-and-aft extending member and a generally fore-and-aft extending bar interconnecting said ends adjacent said fore-and-aft extending member, a pair of horizontally swingable disk gangs, each having a bumper at its inner end and each gang being connected at points outwardly of the bumper for both horizontal swinging and limited transverse displacement relative to the laterally outer portion of said U-shaped frame part and shiftable at its laterally inner portion relative to the associated fore-and-aft extending bar, ground working disks carried by each gang, said disks facing outwardly and said gangs being angularly displaced at their inner ends, whereby soil reaction against the disks tends to shift said gangs laterally inwardly toward one another at their inner ends until said bumpers are in engagement with one another in any angled operating position of said gangs, and means on each of said bars and the inner portions of the associated gangs to limit lateral displacement of the inner portions of said gangs and maintain said bumpers substantially in contact with one another.

6. A disk harrow comprising means serving as a frame, a disk gang disposed generally transversely of the fore-and-aft extending axis of said frame, means connecting the outer end of said gang with said frame means and accommodating horizontal swinging of the inner end of the gang in a generally fore-and-aft direction and limiting transverse displacement of said gang, rounded bumper means on the inner end said disk gang, and means connecting the inner end of said gang with said frame, said last named means including cam means acting in a generally laterally outward direction and located so as to hold the inner portion of said bumper means substantially in alignment with said fore-and-aft extending axis of said frame means in any angularly adjusted position of said gang.

7. A disk harrow comprising means serving as a frame, a disk gang disposed generally transversely of the fore-and-aft extending axis of said frame, means connecting the outer end of said gang with said frame means and accommodating horizontal swinging and limited transverse displacement of said gang, and means connecting the inner end of said gang with said frame, said last named means including a part carried by the frame means adjacent the inner end of said disk gang and extending in a generally fore-and-aft direction, the laterally outer edge of said part lying at an angle to the fore-and-aft extending axis of the disk harrow, and a part on the disk gang adapted to engage said laterally outer edges to be guided thereby, said edge lying at such an angle as to hold the inner end of said gang substantially in alignment with said fore-and-aft extending axis of said frame means in any angularly adjusted position of said gang.

8. A disk harrow comprising means serving as a frame, a pair of disk gangs disposed generally transversely of and on opposite sides of the fore-and-aft extending axis of said frame, the inner end of each gang having a bumper, means connecting the outer end of each of said gangs with laterally outer portions of said frame means and accommodating horizontal swinging and limited transverse displacement of said gangs whereby in different positions of angular adjustment said bumpers may be in mutual reacting engagement substantially in the vertical plane of said fore-and-aft extending axis, and means connecting the inner end portions of said gangs with said frame means and serving to hold the inner end portions of said gangs substantially in their bumper-engaging positions generally in said vertical plane substantially in any angularly adjusted position of said gangs said last mentioned connecting means comprising an abutment on the inner end portion of each of said gangs and a pair of generally fore-and-aft extending parts on said frame means and having angled edge sections adapted to receive said abutments and acting through the latter to hold the inner ends of said gangs against laterally inward displacement.

9. A disk harrow as defined in claim 8, further characterized by means connected between each of said parts and the associated disk gang to lock the latter against displacement in a generally fore and aft direction.

10. The invention set forth in claim 9, further characterized by said locking means acting between each of said pair of parts and the associated gang for holding the latter in selected positions of angular adjustment and comprising a plurality of apertures in each fore-and-aft extending part, an angle controlling bar pivoted to the inner portion of each gang and a pin carried by each angle controlling bar and removably insertable in a selected aperture in said part.

11. A disk harrow comprising frame means including a fore-and-aft extending member and a transverse section rigid with said fore-and-aft extending member and disposed adjacent the forward portion of the fore-and-aft extending member, a rear transverse frame member movably connected with the rear portion of said fore-and-aft extending member rearwardly of said transverse section and swingable about said rear portion, a pair of rear gangs disposed at opposite sides of said rear portion and connected with said rear transverse frame member, wheel carrier means disposed generally transversely of said fore-and-aft extending member and rockably connected in frame-supporting relation with said rigid transverse section, right and left hand frame members each swingably connected with the generally forward portion of said fore-and-aft extending member and having means overlying said wheel carrier means with limited vertical movement relative thereto, and a pair of front gangs connected, respectively, with said right and left hand frame members.

12. A disk harrow comprising a rigid generally fore-and-aft extending main frame member, a rear transverse frame member swingably connected at an intermediate portion to the rear portion of the main frame member for movement relative thereto about a generally fore-and-aft extending axis coinciding with the longitudinal axis of said main frame member, a pair of rear disk gangs connected with said transverse frame member and adjustable thereto about generally vertical axes, a pair of right and left hand front frame members, each including a generally U-shaped frame having ends pivotally connected with said main frame member forward of said rear frame member for generally vertical swinging, a pair of front disk gangs connected, respectively, at their outer end portions with the laterally outer fore-and-aft extending portions of said front frame members and adjustable relative thereto about generally vertical axes, and means slidably connecting the laterally inner portions of said front disk gangs with the laterally inner portions of said U-shaped front frame members generally between the inner ends thereof.

13. In a disk harrow, a fore-and-aft extending main frame member, a wheel carrier including a transverse part supportingly connected at an intermediate portion with said main frame, a pair of gang-supporting U-shaped right and left hand frames, each pivotally connected at its end with said main frame member generally at opposite sides of said wheel carrier, and means acting between said wheel carrier and said gang-supporting frames and including means disposed both below and above said wheel carrier for limiting swinging movement of said gang-supporting frames relative to the main frame member.

14. In a disk harrow, a fore-and-aft extending main frame member, a wheel carrier including a transverse part supportingly connected at an intermediate portion with said main frame, a pair of gang-supporting right and left hand frames, each of said frames comprising a laterally inwardly extending U-shaped part, the laterally outer portion of each part including means having a vertical lost motion connection with the associated outer end portion of said wheel carrier part for generally vertical swinging upwardly away from said part when traversing uneven terrain.

15. In a disk harrow, a fore-and-aft extending main frame member, front gang-receiving frame means connected with said main fore-and-aft extending frame member forward of the rear end thereof, a pair of front disk gangs connected with said front frame means, a rigid transverse rear gang-receiving frame means swingably connected at an intermediate point with the rear end portion of said main frame member, a pair of rear disk gangs connected with said swingable rear frame means, a draft-transmitting generally fore-and-aft extending links loosely connected at their ends with the outer end portions of said front and rear frame means and accommodating swinging of said rear frame means about the rear end of said main frame member as a center, and centrally disposed link means loosely connected at its forward end with the rear portion of said main frame member and at its rear end with the inner ends of said rear gangs for transmitting soil reaction against the inner ends of the rear gangs to the rear portion of said main frame member while accommodating swinging of said rear frame means.

16. In a disk harrow, a fore-and-aft extending main frame member, front gang-receiving frame means connected with said main fore-and-aft extending frame member forward of the rear end thereof, a pair of front disk gangs connected with said front frame means, a rigid transverse rear gang-receiving frame means swingably connected at an intermediate point with the rear end portion of said main frame member, a pair of rear disk gangs connected with said swingable rear frame means, draft-transmitting generally fore-and-aft extending links loosely connected at their ends with the outer end portions of said front and rear frame means and accommodating swinging of said rear frame means about the rear end of said main frame member as a center, centrally disposed link means loosely connected at its forward end with the rear portion of said main frame member, and means on the forward central portion of said rear frame means loosely receiving the rear end of said link means for transmitting soil reaction against the inner ends of the rear gangs to the rear portion of said main frame member while accommodating swinging of said rear frame means.

17. In a disk harrow, a fore-and-aft extending main frame member, a wheel carrier including a transverse part supportingly connected at an intermediate portion with said main frame, front frame means connected with said main frame member and including laterally right and left hand sections, right and left hand disk gangs connected with said front frame sections, a transverse rear gang receiving frame means swingably connected at an intermediate point with the rear end portion of said main frame member, a pair of rear disk gangs connected with said swingable rear frame means, draft-transmitting generally fore-and-aft extending links loosely connected at their ends with the outer end portions of said front and rear frame means and accommodating swinging of said rear frame means about the rear end of said main frame member as a center.

18. A tandem disk harrow comprising, a fore-and-aft extending main frame member, front gang-receiving frame means connected with said main fore-and-aft extending frame member forward of the rear end thereof, a pair of front disk gangs connected with said front frame means, a rigid transverse rear gang-receiving frame means swingably connected at an intermediate point with the rear end portion of said main frame member and including a central section, a pair of rear disk gangs pivotally connected at their laterally outer end portions with said swingable rear frame means, a part pivotally receiving the laterally inner ends of said rear disk gangs and shiftable in a generally fore and aft direction on said central section, and means acting between the rear portion of said main member and said part for adjustably connecting said main frame member and the inner ends of said rear disk gangs so as to detachably fix the latter to said rear frame means in angled position relative thereto.

19. A tandem disk harrow comprising, a fore-and-aft extending main frame member, front gang-receiving frame means connected with said main fore-and-aft extending frame member forward of the rear end thereof, a pair of front disk gangs connected with said front frame means, a rigid transverse rear gang-receiving frame means including a center section swingably mounted on the rear end portion of said main frame member, a pair of rear disk gangs pivotally connected at their outer ends with said swingable rear frame means, means acting between said front frame means and said front disk gangs for fixing the latter to said front frame means in angled position relative thereto, and means acting between said main frame member and said rear disk gangs for fixing the latter to said rear frame means in angled position relative thereto, said last mentioned means comprising a link pivoted to the rear portion of said main frame member and means shiftable along said center section, pivotally receiving the inner ends of said rear gangs, and adjustably connected with said link.

20. In a disk implement, frame means, disk gang means, and mechanism to adjust the position of one of said means relative to the other, including a link pivotally connected to one of said means and having a plurality of notches spaced along one side of the link, lever means pivoted to the other means and swingable through an arc relative to said one means, said lever having a part adapted to enter said openings successively, whereby the lever means when actuated acts through said link to shift said disk gang means, means serving as abutment means carried by said other means and adapted to be received by a notch on said link so as to lock said link against movement relative to said other means, and releasable means engageable with said link to hold a notch thereof in engagement with said abutment means, thereby serving to lock said link and lever against movement.

21. In a disk implement, frame means, disk gang means, and mechanism to adjust the position of one of said means relative to the other, including a link pivotally connected to one of said means and having a plurality of openings, lug means connected with the other means and having an opening, lever means carrying a pivot insertable in said opening, said pivot being adapted to enter one of said link openings, whereby the link serves to lock the gang means in position relative to the frame means, releasable means carried by said lug means to lock said link in engagement with said pivot, and means on said lever means spaced from said pivot and adapted to enter one of said lever recesses, whereby said lever means may be used, when said releasable locking means is released, to shift said gang means relative to said frame means.

22. In a disk harrow, frame means including a generally laterally outwardly extending section having a generally fore and aft extending bar adjacent one end portion of said section, a generally horizontally disposed disk gang swingably connected adjacent one end with the other end portion of said frame section and shiftably connected at its other end with said bar, the shiftable connection comprising a part carried by said bar and having a plurality of generally fore and aft spaced apart apertures, a gang-shifting bar pivoted to said other end of said disk gang, a gang-controlling bar pivoted at one end to said gang-shifting bar and carrying at its other end pin means releasably insertable in selected apertures in said part for locking the disk gang in angled position, and handle means on said gang-shifting bar for changing the angle of said disk gang when said pin means is released from said apertured part.

23. In a disk harrow, a fore-and-aft extending main frame member, a wheel carrier including a transverse part supportingly connected at an intermediate portion with said frame for rocking movement relative thereto and generally downwardly extending wheel-carrying arms fixed to the end portions of said transverse part, a pair of gang-supporting right and left hand frames, each pivotally connected with said main frame member at points on opposite sides of said transverse part and having a laterally outer fore-and-aft extending portion passing underneath said transverse part inside the adjacent wheel-carrying arm, and motion limiting means carried by each fore-and-aft extending frame portion and embracing the associated portion of said transverse part for supporting the outer portions of said transverse part of said gang frames when the wheels are raised and the outer portions of said gang frames on said wheel carrier when the wheels are lowered.

References Cited in the file of this patent

UNITED STATES PATENTS

| | | |
|---|---|---|
| 468,395 | Moore | Feb. 9, 1892 |
| 836,773 | Moore | Nov. 27, 1906 |
| 1,060,280 | Olson | Apr. 29, 1913 |
| 1,247,765 | White | Nov. 27, 1917 |
| 1,351,501 | White | Aug. 31, 1920 |
| 1,619,857 | Dewend | Mar. 8, 1927 |
| 1,715,186 | Boda | May 28, 1929 |
| 2,228,508 | Crumb et al. | Jan. 14, 1941 |
| 2,239,948 | Young | Apr. 29, 1941 |
| 2,266,590 | Dyrr | Dec. 16, 1941 |
| 2,376,609 | McVicar | May 22, 1945 |
| 2,755,613 | Oehler et al. | July 24, 1956 |
| 2,765,609 | Oehler et al. | Oct. 9, 1956 |
| 2,787,105 | Witwer | Apr. 2, 1957 |
| 2,881,578 | Oehler et al. | Apr. 14, 1959 |